United States Patent
Lutaud

(10) Patent No.: US 6,921,082 B2
(45) Date of Patent: Jul. 26, 2005

(54) LIP SEALING RING

(75) Inventor: Dominique Lutaud, Orbigny au Mont (FR)

(73) Assignee: Carl Freudenberg KG, Weinheim (DE)

(*) Notice: Subject to any disclaimer, the term of this patent is extended or adjusted under 35 U.S.C. 154(b) by 152 days.

(21) Appl. No.: 10/194,647

(22) Filed: Jul. 12, 2002

(65) Prior Publication Data

US 2004/0007826 A1 Jan. 15, 2004

(51) Int. Cl.[7] ............................................. F16J 15/32
(52) U.S. Cl. ...................... 277/559; 277/549; 277/562; 277/563; 277/570
(58) Field of Search ........................... 277/549, 559, 277/562, 563, 570

(56) References Cited

U.S. PATENT DOCUMENTS

| | | | | |
|---|---|---|---|---|
| 4,770,424 A | * | 9/1988 | Otto | 277/351 |
| 5,236,606 A | * | 8/1993 | Rangel | 508/161 |
| 5,615,894 A | * | 4/1997 | vom Schemm | 277/559 |
| 5,755,444 A | | 5/1998 | Carnis et al. | |
| 6,336,638 B1 | * | 1/2002 | Guth et al. | 277/500 |
| 6,520,507 B2 | * | 2/2003 | Pataille et al. | 277/561 |

FOREIGN PATENT DOCUMENTS

DE     196 14 828     10/1996

\* cited by examiner

*Primary Examiner*—Enoch Peavey
(74) *Attorney, Agent, or Firm*—Kenyon & Kenyon

(57) ABSTRACT

A lip sealing ring for a relatively movable machine element (1), including a flexible sealing lip (2) made of polymeric material which adjacently encloses the machine element (1) in the region of a sealing gap (3) under elastic prestressing, the sealing gap (3) being penetrated in the longitudinal direction (5) in at least one circumferential location by a spiral stage (4); the spiral stage (4) being bounded by a screw thread-shaped groove (6) in the sealing lip and by the surface (7) of the machine element (1) to be sealed, facing the groove; and the groove (6) connecting the space (8) to be sealed to the surroundings (9). Sealing gap (3) is closed by a thixotropic medium (10) in the region of groove (6) bounding the spiral stage (4).

10 Claims, 2 Drawing Sheets

LIP SEALING RING

BACKGROUND OF THE INVENTION

Field of the Invention and Description of Related Art

The invention relates to a lip sealing ring for a relatively movable machine element, including a flexible sealing lip made of polymeric material which adjacently encloses the machine element in the region of a sealing gap under elastic prestressing, the sealing gap being penetrated in the longitudinal direction in at least one circumferential location by a spiral stage; the spiral stage being bounded by a screw thread-shaped groove in the sealing lip and by the surface of the machine element to be sealed, facing the groove; and the groove connecting the space to be sealed with the surroundings.

Such a lip sealing ring is known from German Patent 195 32 701 C2. The sealing gap is closed off by wax at least in the region of the groove bordering the spiral stage.

SUMMARY OF THE INVENTION

It is an object of the invention to provide a lip sealing ring, of the kind mentioned above, wherein the medium closing the groove can be mounted more simply and therefore cost-effectively, and wherein the sealing gap is securely closed, independently of the surrounding temperatures which prevail during a pressure test.

These and other objects of the invention are achieved by a lip sealing ring for a relatively movable machine element, comprising a flexible sealing lip made of polymeric material which adjacently encloses the machine element in the region of a sealing gap under elastic prestressing, the sealing gap being penetrated in the longitudinal direction in at least one circumferential location by a spiral stage; the spiral stage being bounded by a screw thread-shaped groove in the sealing lip and by the surface of the machine element to be sealed, facing the groove; and the groove connecting the space to be sealed with the surroundings, wherein the sealing gap (3) is closed by a thixotropic medium (10) in the region of the groove (6) bounding the spiral stage (4).

BRIEF DESCRIPTION OF THE DRAWINGS

The present invention will be described in greater detail with reference to the following drawings wherein.

DETAILED DESCRIPTION OF THE INVENTION

Figure 1:
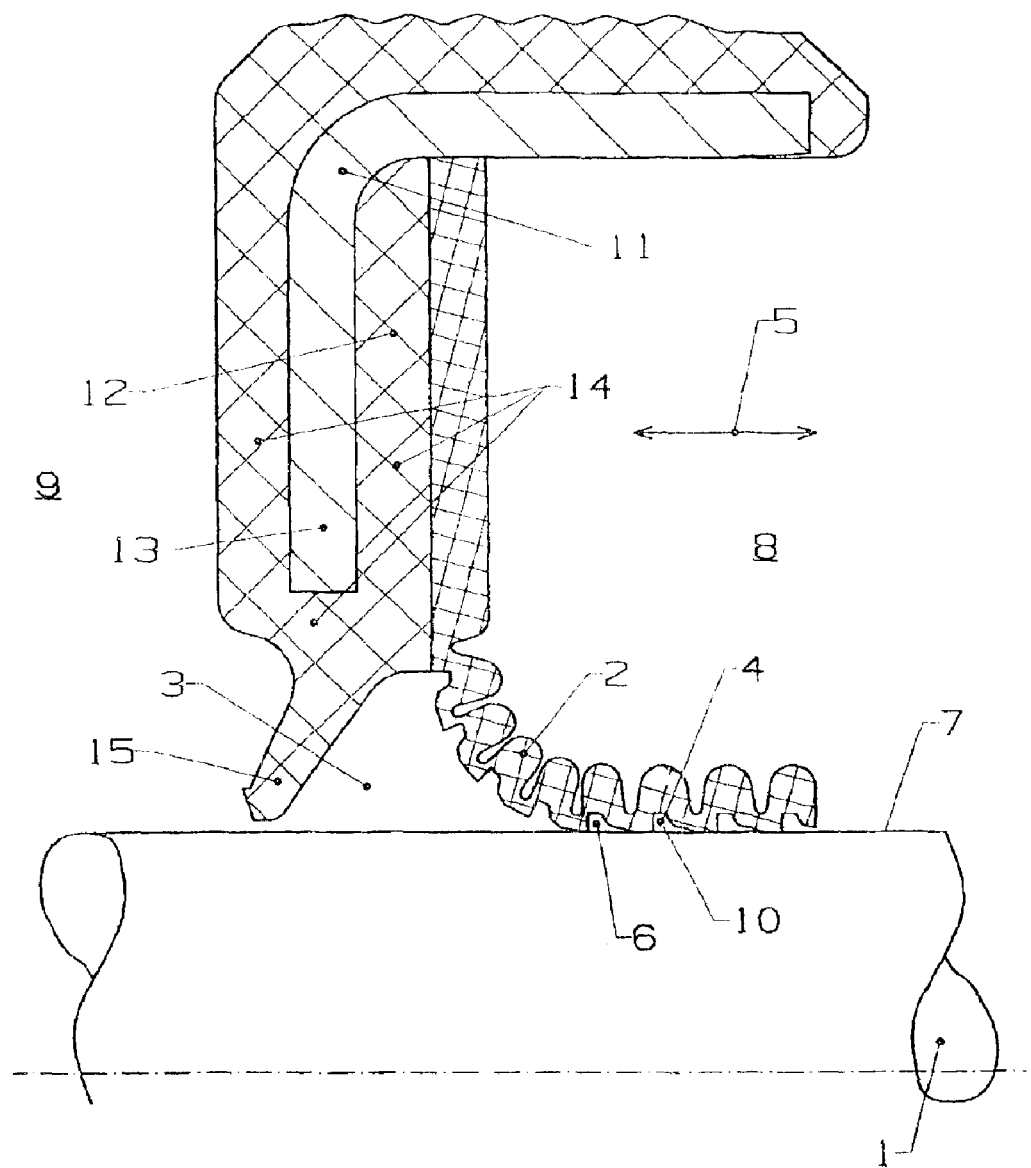
FIG. 1 shows a lip sealing ring of the kind according to the present invention in section.
Figure 2:
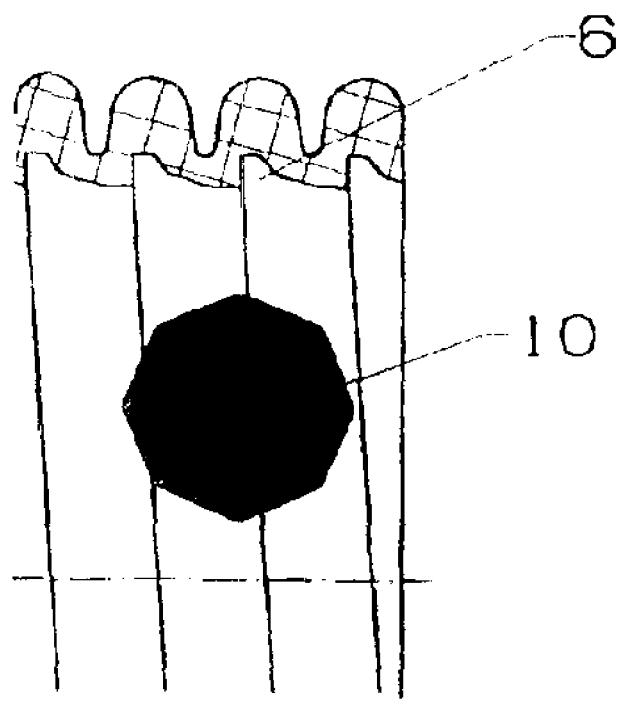
FIG. 2 shows a segment of the sealing lip of the lip sealing ring as in FIG. 1 on the side facing the machine element, in an enlarged representation.

In accordance with the invention, the sealing gap in the region of the groove bounding the spiral stage is closed by a thixotropic medium. In this connection, it is of advantage that the ambient temperature which prevails in the medium during a pressure test has no influence on the viscosity of the medium, and that the medium is therefore safely held inside the groove, even at comparatively high temperatures.

After the mounting of the lip sealing ring on the outer circumference of a machine element, such as a rotationally symmetrical shaft, the groove provides a channel-shaped recess which connects the space to be sealed to the surroundings, and has the purpose of propelling leakage fluids, that get past the sealing gap, back into the space to be sealed by hydrodynamic forces which come about due to the rotating of the shaft. In this context, the spiral stage is designed in such a way that, during rotating of the shaft, the leakage fluid is propelled back in the direction of the space to be sealed, for example, by having the spiral stage include an acute angle with the rotational axis of the shaft.

Lip sealing rings are in many cases mounted by the use of automatic mounting equipment. In such a case it may happen, because of unforeseeable circumstances, that the sealing lip flips over in the wrong direction and/or is damaged. Both because of a sealing lip flipped over in the wrong direction and because of a damaged sealing lip, a satisfactory sealing result may not be achieved. Therefore it is necessary to inspect lip sealing rings after they are mounted, to determine whether the mounting was carried out correctly and/or to make sure that the sealing lip is not damaged. This is difficult to do manually, in particular in the case of installation positions where the place of installation is difficult to inspect. Subsequently to mounting the lip sealing ring, it is therefore customary to fill the space to be sealed with compressed air at a predefined testing pressure, and to observe the pressure drop during a certain time period. If an unusually rapid pressure drop is found, this is a sure sign that the sealing lip was mounted in a faulty manner and/or is damaged.

In order also to be able to inspect lip seals which have a screw thread-shaped groove, which connects the space to be sealed to the surroundings, on the side facing the space to be sealed, it is necessary to close the groove only during the pressure test.

Since the pressure test is not always done at room temperature, but is sometimes done at temperature ranges at which wax begins to melt, thixotropic media have the advantage. Thixotropic media are securely held in the groove even when, for example, the ambient temperature during the pressure test is greater than the melting temperature of waxes. The melting temperature of waxes is generally 50 to 90° C.

If several spiral stages are provided successive to one another in the circumferential direction, or if a sinusoidally running spiral stage repeatedly touches or intersects the sealing gap in the circumferential direction, it is necessary to close each grove present in the circumferential direction within the range of the spiral stage, or each further interruption of the sealing gap by one or the same spiral stage, by use of the thixotropic medium. In this manner, during performance of the pressure test, a hermetic seal is achieved in the space to be sealed in the range of the sealing gap, independently of the number of spiral stages present.

The thixotropic medium can be made of a lubricating oil with an added quantity of silicon compounds. The silicon compounds may be silica, for instance. This has the advantage that the thixotropic medium is particularly environmentally friendly, and therefore does not have to be separately disposed of, following the pressure test. After the successful conclusion of the pressure test, the machine element to be sealed is put into its intended motion, the medium, as a result of shaft rotation and/or the vibrations created, turns liquid and is pumped into the space to be sealed by the conveying effect of the groove. The groove is subsequently free and is completely effective in returning the medium to be sealed into the space to be sealed.

Especially when thixotropic media are based on lubricating oil which contains silica, they are very well tolerated by most media to be sealed, so that the application properties of the medium to be sealed are not disadvantageously influenced after being mixed with the thixotropic medium.

The thixotropic medium may have a color different from the sealing lip. In this context, it is of advantage if an optical control, if necessary, is made possible in an especially simple fashion. It is easy to recognize whether, in the region of the spiral stage, the sealing lip is completely and/or evenly coated with the thixotropic medium. Preferably the medium should contain a dye having an ultraviolet indicator which lights up brightly in ultraviolet light.

For instance, the sealing lip may be made of PTFE. In this connection, PTFE also implies PTFE compounds. For many applications, sealing lips made of PTFE have proven advantageous, since after a certain minimum initial wear, their surfaces glaze, and then have good application properties during a very long service life.

In addition, the present invention relates to a method for closing a spiral stage according to claim 1, which is bounded by a screw thread-shaped groove in the sealing lip of a lip sealing ring and the surface to be sealed, facing the groove, of a machine element to be sealed, the liquid thixotropic medium present in an agitated container being introduced in at least one partial region of the groove of the lip sealing ring which is at rest; the thixotropic medium at first still in liquid form automatically solidifying after its introduction into the groove; and the lip ring being subsequently mounted on the machine element. By the agitation of the container in which the thixotropic medium is present, the latter is liquified or rather kept liquid. After the liquid thixotropic medium is introduced from the container into the groove, the medium automatically solidifies because the lip sealing ring is at rest.

Introducing the liquid thixotropic medium into the groove is preferably done by spraying. This has the advantage that the particles, which form the spray mist, are in motion, i.e. they are liquid. Besides this, the possibility also exists of painting the thixotropic medium onto the surface of the sealing lip facing the machine element and onto the groove.

Subsequently to the solidification of the thixotropic medium, the lip sealing ring may be stored, transported and mounted, the ambient temperature having no influence on the viscosity of the thixotropic medium.

The sealing ring shown in a longitudinal section in FIG. 1 is intended for a relatively movable machine part 1, such as for a shaft rotating about an axis of rotation. The lip sealing ring includes a flexible sealing lip 2 which, in this exemplary embodiment, is made of a PTFE compound. In the exemplary embodiment shown here, sealing lip 2 protrudes axially in the direction of space 8 to be sealed in the fashion of a trumpet's bell, and touches surface 7 of machine element 1. In the region of the largest diameter of sealing lip 2, it is fastened indirectly or directly to a support ring 11, for instance by fastening sealing lip 2 to support ring 11 with the aid of a rubber profile 11.

In the region of its radial projection 13, support ring 11 is embedded in a coating 14 of rubber which adjacently touches surface 7 of machine element 1 on side facing the surroundings 9 with a circular dust lip 15. In the region of sealing gap 3, sealing lip 2 is provided with a screw thread-shaped spiral stage 4 which completely encloses surface 7 of machine element 1, spiral stage 4 being bounded by screw thread-shaped groove 6 and surface 7 of machine element 1. Spiral stage 4 being made in such a way that, when machine element 1 rotates, a conveying effect in the direction of space 8 to be sealed comes about in the region of spiral stage 4.

In this exemplary embodiment, sealing lip 2 is furnished with only one single spiral stage 4, which encloses machine element 1 to be sealed in the fashion of a spiral on its entire outer circumference. In order to avoid pressure losses, during a pressure test, through groove 6 bounding spiral stage 4, it is therefore sufficient if spiral stage 4 is closed at one single circumferential location by thixotropic medium 10. The quantity of thixotropic medium 10 must be such that sealing gap 3 is entirely closed by thixotropic medium 10. If a pressure test is run after the mounting of the lip sealing ring on machine element 1, sealing lip 2 is pressed more strongly against surface 7 of machine element 1 by the increasing pressure in space 8 to be sealed, which increases the sealing effect. No pressure gas can escape in the region of spiral stage 4. In the case of an undamaged and correctly mounted lip sealing ring, the gas pressure is kept largely constant during the pressure test.

As opposed to this, a comparatively rapid pressure loss would ensue if the lip sealing ring were damage and/or mounted in a faulty manner.

During the intended use, a relative motion takes place between sealing lip 2 and surface 7 of relatively rotating machine element 1, the relative motion of machine element 1 also generating vibrations. Thixotropic medium 10 closing sealing gap 3 is liquified thereby, and is conveyed in the direction of space 8 that is to be sealed. Spiral stage 4 can thereby subsequently fully play the role for which it is provided, namely returning leakage fluid into space 8 that is to be sealed.

What is claimed is:

1. A lip sealing ring for a relatively movable machine element, comprising:
   a flexible sealing lip; and
   a thixotropic medium, the flexible sealing lip made of polymeric materials which adjacently encloses the machine element in the region of a sealing gap under elastic prestressing, the sealing gap being penetrated in the longitudinal direction in at least one circumferential location by a spiral stage; the spiral stage being bounded by a screw thread-shaped groove in the sealing lip and by the surface of the machine element to be sealed, facing the groove; and the groove connecting the space to be sealed with the surroundings, wherein the sealing gap (3) is enclosed by the thixotropic medium (10) in the region of the groove (6) down the spiral stage (4).

2. The lip sealing ring according to claim 1, wherein the thixotropic medium (10) is made of a lubricating oil having an admixture of silicone compounds.

3. The lip sealing ring according to claim 2, wherein the silicone compounds are made of silica.

4. The lip sealing ring according to claim 1, wherein the thixotropic medium (10) has a color divergent from the sealing lip (2).

5. The lip sealing ring according to claim 2, wherein the thixotropic medium (10) has a color divergent from the sealing lip (2).

6. The lip sealing ring according to claim 3, wherein the thixotropic medium (10) has a color divergent from the sealing lip (2).

7. The lips sealing ring according to claim 1, wherein the sealing lip (2) is made of PTFE.

8. The lip sealing ring according to claim 2, wherein the sealing lip (2) is made of PTFE.

9. The lip sealing ring according to claim 3, wherein the sealing lip (2) is made of PTFE.

10. The lip sealing ring according to claim 4, wherein the sealing lip (2) is made of PTFE.

* * * * *